United States Patent
Winograd et al.

(10) Patent No.: US 12,342,040 B2
(45) Date of Patent: Jun. 24, 2025

(54) WATERMARK-BASED DYNAMIC AD INSERTION

(71) Applicant: Verance Corporation, San Diego, CA (US)

(72) Inventors: Joseph M. Winograd, San Diego, CA (US); Rade Petrovic, Fremont, CA (US); Jian Zhao, La Canada, CA (US); Patrick George Downes, San Diego, CA (US)

(*) Notice: Subject to any disclaimer, the term of this patent is extended or adjusted under 35 U.S.C. 154(b) by 0 days.

(21) Appl. No.: 18/476,271

(22) Filed: Sep. 27, 2023

(65) Prior Publication Data

US 2024/0098334 A1 Mar. 21, 2024

Related U.S. Application Data

(63) Continuation of application No. 17/006,751, filed on Aug. 28, 2020, now abandoned.

(60) Provisional application No. 62/909,139, filed on Oct. 1, 2019, provisional application No. 62/893,138, filed on Aug. 28, 2019.

(51) Int. Cl.
| | |
|---|---|
| *H04N 21/44* | (2011.01) |
| *G06T 1/00* | (2006.01) |
| *G10L 19/018* | (2013.01) |
| *H04N 21/81* | (2011.01) |
| *H04N 21/8358* | (2011.01) |

(52) U.S. Cl.
CPC ..... *H04N 21/44016* (2013.01); *G06T 1/0092* (2013.01); *G10L 19/018* (2013.01); *H04N 21/812* (2013.01); *H04N 21/8358* (2013.01)

(58) Field of Classification Search
CPC .......... H04N 21/44016; H04N 21/812; H04N 21/8358; H04N 21/23424; G06T 1/0092; G10L 19/018
USPC .......................................................... 725/32
See application file for complete search history.

(56) References Cited

U.S. PATENT DOCUMENTS

| | | |
|---|---|---|
| 6,122,610 A | 9/2000 | Isabelle |
| 6,145,081 A | 11/2000 | Winograd et al. |
| 6,175,627 B1 | 1/2001 | Petrovic et al. |

(Continued)

FOREIGN PATENT DOCUMENTS

| | | |
|---|---|---|
| CN | 103533343 | 1/2014 |
| EP | 1474924 | 11/2004 |

(Continued)

OTHER PUBLICATIONS

Extended European Search Report dated Nov. 21, 2017 for European Application No. 15785628.7 (7 pages).

(Continued)

*Primary Examiner* — Cynthia M Fogg

(57) ABSTRACT

A watermark-based dynamic ad insertion (DAI) technique for presenting different users of content different advertisements based on the user's profile for content viewed on broadcast channels or in multichannel video programming distributor (MVPD) channels. A number of solutions issues with watermark-based DAI are presented. Interoperability is addressed by providing a multiplexing technique so that the DAI watermarks do not interfere with other watermarks, such as ATSC 3.0 watermarks. Reliability is addressed by providing a matched filtering technique. Security is addressed by providing a mutual authentication technique.

16 Claims, 4 Drawing Sheets

(56) References Cited

U.S. PATENT DOCUMENTS

| | | | |
|---|---|---|---|
| 6,411,725 B1 * | 6/2002 | Rhoads | G06T 1/0028 |
| | | | 707/E17.112 |
| 6,427,012 B1 | 7/2002 | Petrovic | |
| 6,430,301 B1 | 8/2002 | Petrovic | |
| 6,490,579 B1 | 12/2002 | Gao et al. | |
| 6,577,747 B1 | 6/2003 | Kalker et al. | |
| 6,683,958 B2 | 1/2004 | Petrovic | |
| 6,721,439 B1 | 4/2004 | Levy et al. | |
| 6,792,542 B1 | 9/2004 | Lee et al. | |
| 6,839,673 B1 | 1/2005 | Choi et al. | |
| 6,888,943 B1 | 5/2005 | Lam et al. | |
| 6,931,536 B2 | 8/2005 | Hollar | |
| 7,024,018 B2 | 4/2006 | Petrovic | |
| 7,140,043 B2 | 11/2006 | Choi et al. | |
| 7,159,118 B2 | 1/2007 | Petrovic | |
| 7,224,819 B2 | 5/2007 | Levy et al. | |
| 7,343,397 B2 | 3/2008 | Kochanski | |
| 7,460,667 B2 | 12/2008 | Lee et al. | |
| 7,533,266 B2 | 5/2009 | Bruekers et al. | |
| 7,548,565 B2 | 6/2009 | Sull et al. | |
| 7,689,532 B1 | 3/2010 | Levy | |
| 7,707,422 B2 | 4/2010 | Shin et al. | |
| 7,774,834 B1 | 8/2010 | Chauhan et al. | |
| 7,779,271 B2 | 8/2010 | Langelaar | |
| 7,983,922 B2 | 7/2011 | Neusinger et al. | |
| 7,986,806 B2 | 7/2011 | Rhoads | |
| 7,991,995 B2 | 8/2011 | Rabin et al. | |
| 8,005,258 B2 | 8/2011 | Petrovic et al. | |
| 8,015,410 B2 | 9/2011 | Pelly et al. | |
| 8,055,013 B2 | 11/2011 | Levy et al. | |
| 8,059,815 B2 | 11/2011 | Lofgren et al. | |
| 8,059,858 B2 | 11/2011 | Brundage et al. | |
| 8,081,757 B2 | 12/2011 | Voessing et al. | |
| 8,085,935 B2 | 12/2011 | Petrovic | |
| 8,103,049 B2 | 1/2012 | Petrovic et al. | |
| 8,138,930 B1 | 3/2012 | Heath | |
| 8,151,113 B2 | 4/2012 | Rhoads | |
| 8,181,262 B2 | 5/2012 | Cooper et al. | |
| 8,189,861 B1 | 5/2012 | Rucklidge | |
| 8,194,803 B2 | 6/2012 | Baum et al. | |
| 8,249,992 B2 | 8/2012 | Harkness et al. | |
| 8,259,873 B2 | 9/2012 | Baum et al. | |
| 8,280,103 B2 | 10/2012 | Petrovic et al. | |
| 8,301,893 B2 | 10/2012 | Brundage | |
| 8,315,835 B2 | 11/2012 | Tian et al. | |
| 8,321,679 B2 | 11/2012 | Petrovic et al. | |
| 8,340,348 B2 | 12/2012 | Petrovic et al. | |
| 8,346,532 B2 | 1/2013 | Chakra et al. | |
| 8,346,567 B2 | 1/2013 | Petrovic et al. | |
| 8,467,717 B2 | 6/2013 | Croy et al. | |
| 8,479,225 B2 | 7/2013 | Covell et al. | |
| 8,483,136 B2 | 7/2013 | Yuk et al. | |
| 8,533,481 B2 | 9/2013 | Petrovic et al. | |
| 8,538,066 B2 | 9/2013 | Petrovic et al. | |
| 8,560,604 B2 | 10/2013 | Shribman et al. | |
| 8,588,459 B2 | 11/2013 | Bloom et al. | |
| 8,589,969 B2 | 11/2013 | Falcon | |
| 8,601,504 B2 | 12/2013 | Stone et al. | |
| 8,615,104 B2 | 12/2013 | Petrovic et al. | |
| 8,666,528 B2 | 3/2014 | Harkness et al. | |
| 8,682,026 B2 | 3/2014 | Petrovic et al. | |
| 8,726,304 B2 | 5/2014 | Petrovic et al. | |
| 8,745,403 B2 | 6/2014 | Petrovic | |
| 8,768,714 B1 | 7/2014 | Blesser | |
| 8,781,967 B2 | 7/2014 | Tehranchi et al. | |
| 8,791,789 B2 | 7/2014 | Petrovic et al. | |
| 8,806,517 B2 | 8/2014 | Petrovic et al. | |
| 8,811,655 B2 | 8/2014 | Petrovic et al. | |
| 8,825,518 B2 | 9/2014 | Levy | |
| 8,838,977 B2 | 9/2014 | Winograd et al. | |
| 8,838,978 B2 | 9/2014 | Winograd et al. | |
| 8,869,222 B2 | 10/2014 | Winograd et al. | |
| 8,898,720 B2 | 11/2014 | Eyer | |
| 8,923,548 B2 | 12/2014 | Petrovic et al. | |
| 8,959,202 B2 | 2/2015 | Haitsma et al. | |
| 8,990,663 B2 | 3/2015 | Liu et al. | |
| 9,009,482 B2 | 4/2015 | Winograd | |
| 9,042,598 B2 | 5/2015 | Ramaswamy et al. | |
| 9,055,239 B2 | 6/2015 | Tehranchi et al. | |
| 9,106,964 B2 | 8/2015 | Zhao | |
| 9,117,270 B2 | 8/2015 | Wong et al. | |
| 9,147,402 B2 | 9/2015 | Chen et al. | |
| 9,277,183 B2 | 3/2016 | Eyer | |
| 9,596,521 B2 | 3/2017 | Winograd et al. | |
| 9,602,891 B2 | 3/2017 | Winograd et al. | |
| 9,607,131 B2 | 3/2017 | Winograd et al. | |
| 2002/0032864 A1 | 3/2002 | Rhoads et al. | |
| 2002/0059622 A1 | 5/2002 | Grove et al. | |
| 2002/0078233 A1 | 6/2002 | Biliris et al. | |
| 2002/0138695 A1 | 9/2002 | Beardsley et al. | |
| 2003/0012403 A1 | 1/2003 | Rhoads et al. | |
| 2003/0055979 A1 | 3/2003 | Cooley | |
| 2003/0084294 A1 | 5/2003 | Aoshima et al. | |
| 2003/0103645 A1 | 6/2003 | Levy | |
| 2003/0193616 A1 | 10/2003 | Baker et al. | |
| 2003/0228030 A1 | 12/2003 | Wendt | |
| 2004/0039914 A1 | 2/2004 | Barr et al. | |
| 2004/0098370 A1 | 5/2004 | Garland et al. | |
| 2004/0101160 A1 | 5/2004 | Kunisa | |
| 2004/0250080 A1 | 12/2004 | Levy et al. | |
| 2005/0182792 A1 | 8/2005 | Israel et al. | |
| 2006/0047704 A1 | 3/2006 | Gopalakrishnan | |
| 2006/0053292 A1 | 3/2006 | Langelaar | |
| 2006/0062426 A1 | 3/2006 | Levy et al. | |
| 2006/0083242 A1 | 4/2006 | Pulkkinen | |
| 2006/0115108 A1 | 6/2006 | Rodriguez et al. | |
| 2006/0239501 A1 | 10/2006 | Petrovic et al. | |
| 2007/0003103 A1 | 1/2007 | Lemma et al. | |
| 2007/0039018 A1 | 2/2007 | Saslow et al. | |
| 2007/0071037 A1 | 3/2007 | Abraham et al. | |
| 2007/0135084 A1 | 6/2007 | Ido et al. | |
| 2007/0250560 A1 | 10/2007 | Wein et al. | |
| 2008/0002854 A1 | 1/2008 | Tehranchi et al. | |
| 2008/0037825 A1 | 2/2008 | Lofgren et al. | |
| 2008/0263612 A1 | 10/2008 | Cooper | |
| 2008/0297654 A1 | 12/2008 | Verberkt et al. | |
| 2008/0301304 A1 | 12/2008 | Chitsaz et al. | |
| 2009/0060055 A1 | 3/2009 | Blanchard et al. | |
| 2009/0089078 A1 | 4/2009 | Bursey | |
| 2009/0158318 A1 | 6/2009 | Levy | |
| 2009/0319639 A1 | 12/2009 | Gao et al. | |
| 2010/0023489 A1 | 1/2010 | Miyata et al. | |
| 2010/0054531 A1 | 3/2010 | Kogure et al. | |
| 2010/0063978 A1 | 3/2010 | Lee et al. | |
| 2010/0097494 A1 | 4/2010 | Gum et al. | |
| 2010/0111355 A1 | 5/2010 | Petrovic et al. | |
| 2010/0131461 A1 | 5/2010 | Prahlad et al. | |
| 2010/0145926 A1 * | 6/2010 | Jeong | G06Q 30/02 |
| | | | 707/E17.108 |
| 2010/0172540 A1 | 7/2010 | Davis et al. | |
| 2010/0174608 A1 | 7/2010 | Harkness et al. | |
| 2010/0281142 A1 | 11/2010 | Stoyanov | |
| 2010/0325646 A1 | 12/2010 | Alhadeff et al. | |
| 2011/0058188 A1 | 3/2011 | Guo et al. | |
| 2011/0088075 A1 | 4/2011 | Eyer | |
| 2011/0103444 A1 | 5/2011 | Baum et al. | |
| 2011/0161086 A1 | 6/2011 | Rodriguez | |
| 2011/0164784 A1 | 7/2011 | Grill et al. | |
| 2011/0188700 A1 | 8/2011 | Kim et al. | |
| 2011/0261667 A1 | 10/2011 | Ren et al. | |
| 2011/0281574 A1 | 11/2011 | Patel et al. | |
| 2011/0286625 A1 | 11/2011 | Petrovic et al. | |
| 2011/0293090 A1 | 12/2011 | Ayaki et al. | |
| 2011/0307545 A1 | 12/2011 | Bouazizi | |
| 2011/0320627 A1 | 12/2011 | Landow et al. | |
| 2012/0023595 A1 | 1/2012 | Speare et al. | |
| 2012/0063635 A1 | 3/2012 | Matsushita et al. | |
| 2012/0072731 A1 | 3/2012 | Winograd et al. | |
| 2012/0102304 A1 | 4/2012 | Brave | |
| 2012/0113230 A1 | 5/2012 | Jin | |
| 2012/0116883 A1 * | 5/2012 | Asam | G06Q 30/0261 |
| | | | 705/14.58 |
| 2012/0117031 A1 | 5/2012 | Cha et al. | |

(56) References Cited

U.S. PATENT DOCUMENTS

| | | | |
|---|---|---|---|
| 2012/0117584 A1* | 5/2012 | Gordon | H04N 21/8358 725/19 |
| 2012/0122429 A1 | 5/2012 | Wood et al. | |
| 2012/0129547 A1 | 5/2012 | Andrews, III et al. | |
| 2012/0203556 A1 | 8/2012 | Villette et al. | |
| 2012/0203734 A1 | 8/2012 | Spivack et al. | |
| 2012/0216236 A1 | 8/2012 | Robinson et al. | |
| 2012/0265735 A1 | 10/2012 | McMillan et al. | |
| 2012/0272012 A1 | 10/2012 | Aronovich et al. | |
| 2012/0272327 A1 | 10/2012 | Shin et al. | |
| 2012/0300975 A1 | 11/2012 | Chalamala et al. | |
| 2012/0304206 A1 | 11/2012 | Roberts et al. | |
| 2012/0308071 A1 | 12/2012 | Ramsdell et al. | |
| 2013/0006866 A1* | 1/2013 | Pendakur | G06Q 30/0277 705/50 |
| 2013/0007462 A1 | 1/2013 | Petrovic et al. | |
| 2013/0024894 A1 | 1/2013 | Eyer | |
| 2013/0031579 A1 | 1/2013 | Klappert | |
| 2013/0060837 A1 | 3/2013 | Chakraborty et al. | |
| 2013/0073065 A1 | 3/2013 | Chen et al. | |
| 2013/0077699 A1 | 3/2013 | Gifford et al. | |
| 2013/0114848 A1 | 5/2013 | Petrovic et al. | |
| 2013/0117571 A1 | 5/2013 | Petrovic et al. | |
| 2013/0129303 A1 | 5/2013 | Lee et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2013/0171926 A1 | 7/2013 | Distribeo | |
| 2013/0188923 A1 | 7/2013 | Hartley et al. | |
| 2013/0227293 A1 | 8/2013 | Leddy et al. | |
| 2013/0271657 A1 | 10/2013 | Park et al. | |
| 2014/0037132 A1 | 2/2014 | Heen et al. | |
| 2014/0047475 A1 | 2/2014 | Oh et al. | |
| 2014/0059116 A1 | 2/2014 | Oh et al. | |
| 2014/0059591 A1 | 2/2014 | Terpstra et al. | |
| 2014/0067950 A1 | 3/2014 | Winograd | |
| 2014/0068686 A1 | 3/2014 | Oh et al. | |
| 2014/0074855 A1 | 3/2014 | Zhao et al. | |
| 2014/0075465 A1 | 3/2014 | Petrovic et al. | |
| 2014/0075469 A1 | 3/2014 | Zhao | |
| 2014/0114456 A1 | 4/2014 | Stavropoulos et al. | |
| 2014/0115644 A1 | 4/2014 | Kim et al. | |
| 2014/0130087 A1 | 5/2014 | Cho et al. | |
| 2014/0142958 A1 | 5/2014 | Sharma et al. | |
| 2014/0149395 A1 | 5/2014 | Nakamura et al. | |
| 2014/0196071 A1 | 7/2014 | Terpstra et al. | |
| 2014/0219495 A1 | 8/2014 | Hua | |
| 2014/0267907 A1 | 9/2014 | Downes et al. | |
| 2014/0270337 A1 | 9/2014 | Zhao et al. | |
| 2014/0279549 A1 | 9/2014 | Petrovic et al. | |
| 2014/0282695 A1* | 9/2014 | Bakar | G06Q 30/0241 725/32 |
| 2014/0325550 A1 | 10/2014 | Winograd et al. | |
| 2014/0325673 A1 | 10/2014 | Petrovic | |
| 2015/0030200 A1 | 1/2015 | Petrovic et al. | |
| 2015/0043728 A1 | 2/2015 | Kim et al. | |
| 2015/0043768 A1 | 2/2015 | Breebaart | |
| 2015/0052571 A1 | 2/2015 | Stokking et al. | |
| 2015/0063659 A1 | 3/2015 | Poder et al. | |
| 2015/0093016 A1 | 4/2015 | Jiang et al. | |
| 2015/0121534 A1 | 4/2015 | Zhao et al. | |
| 2015/0170661 A1 | 6/2015 | Srinivasan | |
| 2015/0229979 A1 | 8/2015 | Wood et al. | |
| 2015/0261753 A1 | 9/2015 | Winograd et al. | |
| 2015/0264429 A1 | 9/2015 | Winograd et al. | |
| 2015/0324947 A1 | 11/2015 | Winograd et al. | |
| 2015/0340045 A1 | 11/2015 | Hardwick et al. | |
| 2016/0037189 A1 | 2/2016 | Holden et al. | |
| 2016/0055606 A1 | 2/2016 | Petrovic et al. | |
| 2016/0055607 A1 | 2/2016 | Petrovic et al. | |
| 2016/0057317 A1 | 2/2016 | Zhao et al. | |
| 2016/0148334 A1* | 5/2016 | Petrovic | H04N 21/435 382/100 |
| 2016/0150297 A1 | 5/2016 | Petrovic et al. | |
| 2016/0182973 A1 | 6/2016 | Winograd et al. | |
| 2016/0182977 A1* | 6/2016 | Mitra | H04N 21/8586 725/34 |
| 2016/0241932 A1 | 8/2016 | Winograd et al. | |
| 2016/0373418 A1* | 12/2016 | Ståhl | G06F 21/44 |
| 2017/0169462 A1* | 6/2017 | Meredith | G06Q 30/0244 |
| 2017/0272839 A1 | 9/2017 | Winograd et al. | |
| 2017/0280205 A1 | 9/2017 | Winograd et al. | |
| 2017/0374434 A1 | 12/2017 | Petrovic et al. | |
| 2018/0018748 A1 | 1/2018 | Petrovic et al. | |
| 2018/0234728 A1* | 8/2018 | Hwang | H04H 20/106 |
| 2020/0007922 A1* | 1/2020 | Yun | H04N 21/4532 |
| 2020/0034874 A1* | 1/2020 | Narayan | G06Q 30/0277 |
| 2020/0275168 A1* | 8/2020 | Merchant | G06F 21/64 |
| 2021/0176538 A1* | 6/2021 | Littlejohn | H04N 21/8358 |

FOREIGN PATENT DOCUMENTS

| | | |
|---|---|---|
| EP | 2439735 | 4/2012 |
| EP | 2489181 | 8/2012 |
| EP | 2899720 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 | 7/2013 |
| KR | 1020130074922 | 7/2013 |
| KR | 101352917 | 1/2014 |
| KR | 10201424049 | 7/2014 |
| WO | 9803014 | 1/1998 |
| WO | WO 2000059148 | 10/2000 |
| WO | WO 2005017827 | 2/2005 |
| WO | WO 2005038778 | 4/2005 |
| WO | WO 2006051043 | 5/2006 |
| WO | WO 2008045880 | 4/2008 |
| WO | WO 2009031082 | 3/2009 |
| WO | WO 2010073236 | 7/2010 |
| WO | WO 2010135687 | 11/2010 |
| WO | WO 2011046590 | 4/2011 |
| WO | WO 2011116309 | 9/2011 |
| WO | WO 2012177126 | 12/2012 |
| WO | WO 2012177874 | 12/2012 |
| WO | WO 2013025035 | 2/2013 |
| WO | 2013067439 | 5/2013 |
| WO | WO 2013163921 | 11/2013 |
| WO | WO 2014014252 | 1/2014 |
| WO | WO 2015138798 | 9/2015 |
| WO | WO 2015168697 | 11/2015 |
| WO | WO 2015174086 | 11/2015 |
| WO | WO 2016028934 | 2/2016 |
| WO | WO 2016028936 | 2/2016 |
| WO | WO 2016029055 | 2/2016 |
| WO | WO 2016086047 | 6/2016 |

OTHER PUBLICATIONS

Partial Supplementary European Search Report dated Feb. 23, 2018 for European Application No. 15833725.3 (12 pages).

Extended European Search Report dated Feb. 23, 2018 for European Application No. 15833741.0 (8 pages).

"ATSC-3.0 Automatic Content Recognition Watermarking Solutions," ATSC Technology Group, Advanced Television Systems Committee, Inc., Jan. 2014 (6 pages).

Aris Technologies, Inc. "Audio Watermarking System to Screen Digital Audio Content for LCM Acceptance," May 1999 (17 pages).

Bangaleea, R., et al., "Performance improvement of spread spectrum spatialdomain watermarking scheme through diversity and attack characterisation," IEEE Africon, pp. 293-298, 2002.

(56) References Cited

OTHER PUBLICATIONS

Extended European Search Report dated Sep. 21, 2017 for European Application No. 15762332.3 (9 pages).
Furon, T., "A constructive and unifying framework for zero-bit watermarking," CS.MM, Jan. 12, 2007.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
International Search Report and Written Opinion dated Apr. 12, 2016 for International Application No. PCT/US2015/066872, filed Dec. 18, 2015 (7 pages).
International Search Report and Written Opinion dated Aug. 13, 2015 for International Application No. PCT/US2015/029097, filed May 4, 2015 (14 pages).
International Search Report and Written Opinion dated Dec. 7, 2015 for International Application No. PCT/US2015/045960, filed Aug. 19, 2015 (14 pages).
International Search Report and Written Opinion dated Jan. 21, 2016 for International Application No. PCT/US2015/046166, filed Aug. 20, 2015 (8 pages).
International Search Report and Written Opinion dated Jan. 28, 2016 for International Application No. PCT/US2015/045964, filed Aug. 19, 2015 (8 pages).
International Search Report and Written Opinion dated Mar. 15, 2016 for International Application No. PCT/US2015/062514, filed Nov. 24, 2015 (10 pages).
International Search Report and Written Opinion dated May 28, 2015 for International Application No. PCT/US2015/020282, filed Mar. 12, 2015 (7 pages).
Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content screening using a dual watermarking and fingerprinting system," Multimedia '02 Proceedings of the tenth ACM international conference on Multimedia, 2002 (11 pages).
Office Action dated Jul. 28, 2016 for Korean Patent Application No. 10-2016-7002289 (11 pages).
Office Action dated Jun. 10, 2016 for Korean Patent Application No. 10-2016-7002291 (19 pages). .
Office action dated Nov. 30, 2016 for Korean Patent Application No. 10-2016-7002289 (4 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).

* cited by examiner

| VIDEO FORMAT | | | RELIABILITY (% of frames decoded succesfully) | | | | | |
|---|---|---|---|---|---|---|---|---|
| | | | Scene Change Frames | | | All Frames | | |
| CODEC | LINES | MBPS | SECDED | BCH | MF | SECDED | BCH | MF |
| MP2 | 1080 | 19 | 100% | 100% | 100% | 99% | 100% | 100% |
| AVC | 1080 | 9 | 100% | 100% | 100% | 99% | 100% | 100% |
| MP2 | 1080 | 8 | 99% | 100% | 100% | 85% | 100% | 100% |
| AVC | 1080 | 5 | 99% | 100% | 100% | 86% | 100% | 100% |
| HEVC | 1080 | 5 | 98% | 100% | 100% | 75% | 100% | 100% |
| MP2 | 720 | 8 | 98% | 100% | 100% | 93% | 100% | 100% |
| HEVC | 1080 | 2.5 | 83% | 99% | 100% | 27% | 97% | 100% |
| MP2 | 420 | 5 | 31% | 98% | 100% | 44% | 99% | 100% |

FIG. 1

WATERMARK-BASED DYNAMIC AD INSERTION

FIELD OF INVENTION

The present invention generally relates to the field of content distribution. More particularly, the disclosed embodiments relate to dynamic ad insertion in broadcast content.

BACKGROUND

This section is intended to provide a background or context to the disclosed embodiments that are recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Dynamic ad insertion (DAI) is a technique for presenting different users of content different advertisements based on the user's profile for content. DAI has been widely adopted in Over-the-Top (OTT) media consumption. For content viewed on broadcast channels or in multichannel video programming distributor (MVPD) channels DAI has not been generally available.

BRIEF DESCRIPTION OF THE DRAWINGS

FIG. 1 shows test results indicating reliability for embodiments of the invention.

SUMMARY OF THE INVENTION

Figure 2:
FIG. 2 illustrating the swapping of publisher data paths in accordance with an embodiment of the invention.

This section is intended to provide a summary of certain exemplary embodiments and is not intended to limit the scope of the embodiments that are disclosed in this application.

Disclosed embodiments relate to a method of facilitating dynamic ad insertion in content. The method includes assigning a default ad an identifying number, wherein the default ad is inserted into programming content at a splicing location in the programming content and linking the identifying number to a replacement ad. A watermark payload is generated which includes the identifying number. The watermark payload is embedded in the content and the content is broadcast to a client device. The client device detects the embedded watermark payload in the content and a replacement ad associated with the identifying number is inserted at the splicing location in the programming content.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

BACKGROUND

Dynamic Ad Insertion (DAI), also known as Targeted Advertisement (TA), is the technique where different users see different ads based on their interests, location, age, gender, etc. or generally based on profile created in view of user's input to a device over time and other data in public domain. DAI is expected to increase likelihood that the user will engage with the message and ultimately make the purchase. DAI is well established in Over-The-Top (OTT) media consumption, but it is not yet available on broadcast channels or in multichannel video programming distributor (MVPD) channels. It should be noted that there are techniques that allow ad insertion by different participants in content distribution chain, such as that described in SCTE 35 standard (https://www.scte.org/SCTEDocs/Standards/ANSI_SCTE%2035%202019r1.pdf), but it requires delivery of metadata used to identify advertisement breaks, advertising content, and programing content, and this metadata is currently not delivered to the end user, in particular if end user receives the content over HDMI link.

In order to enable delivery of metadata to the end user ATSC 3.0 standard has introduced digital watermarks in both audio (https://www.atsc.org/atsc-30-standard/a3342016-audio-watermark-emission/) and video (https://www.atsc.org/wp-content/uploads/2016/09/A335-2016-Video-Watermark-Emission-4.pdf) component of multimedia broadcasts. This disclosure addresses issues related to DAI based on watermarks and proposes solutions to those issues. For additional details related to the use of watermarks for DAI see: U.S. Pat. Nos. 9,602,891; 9,942,602; and 10,354,354; as well as US patent applications US 20140074855 and 20190132652. The contents of the above patents and patent applications are hereby incorporated by reference.

Constraints

Typically, advertisement slots in broadcast content are all filled in, even if some of them are replaceable. Replaceable ads are usually called "default ads" and they are shown to the user if DAI fails to activate. However, if DAI is active it is important that there is no bleeding through of default ad to the end user (partial presentation of the default ad), which would be confusing and perhaps annoying. It is also important that replacement ad ends in time and does not step on programing content.

One particular concern is that during live broadcasts the timing of advertising breaks is not known in advance and can be triggered at any time. However, even in distribution channels with full metadata available it may not be possible to splice in an ad instantaneously. For example, SCTE 35 standard recommends that the splicing points are announced at least 4 seconds in advance in live broadcasts (for both network-out and network-in splice points).

It is desirable that most of default ads are replaced with a targeted ad, but failure to activate DAI is not considered confusing or annoying to end user.

On the other hand, if user initiates an action on an upstream device from the TV set, e.g. on a Set Top Box (STB) or Digital Video Recorder (DVR), such as channel change, pause, speed change (forward/back, fast/slow), skip (forward/back), volume change, user guide or other user interface overlay display, etc. it is important that user sees an effect of his action. It is unacceptable to leave user thinking that STB is malfunctioning or even that it is too slow to react to users' input.

Once the DAI technique is in place it is desirable that ad replacement is done in controlled manner, in agreement with content publisher and content distributors. Rogue players may try to replace default ads with their own targeted ads which would deny ad revenue to content owners and/or content distributors. So, it is desirable to prevent unlicensed users to access the metadata, and in particular to access the timing of ad breaks. It is well known to those skilled in the art that the encryption can be used to prevent unauthorized access to information. Yet in the case of DAI the encryption alone may not be enough, and in some scenarios simply detection of the placement of encrypted messages may be used to thwart the system. Also, proper encryption of short messages is not trivial, and it is desirable to use well tested encryption systems.

It should be also noted that watermarking has been proposed and used for many other purposes besides DAI, such as usage measurement, second screen communication etc. In particular ATSC 3.0 watermarking has been introduced for interactivity such as audio replacement, emergency alert, dynamic events etc. It is therefore important that watermarks used for DAI do not interfere with other watermark uses. In particular if DAI uses the watermarks specified by ATSC 3.0, they need to be multiplexed in a controlled manner with other watermarks. For procedural simplicity it would be preferred, if possible, to achieve coexistence of DAI watermarks with other ATSC watermarks without changing ATSC specifications.

Proposed Solutions

In this disclosure we will consider ATSC watermark-based DAI, because ATSC watermarks are public, well tested and available under RAND conditions. However, the proposed solutions could be used with other watermarking systems as well. We will consider usage of either audio or video watermarks, or both of them simultaneously. It is well known that ATSC audio watermarks have much smaller throughput (amount of information per unit time) than video watermarks, while video watermarks have disadvantage of being perceptible on some TV sets, and they are easier to remove or forge.

In order to execute DAI, the receiver needs first to identify the channel that is presented as well as the address of a server associated with the detected channel, which supports DAI. Those objectives can be achieved with either audio or video ATSC watermarks, as specified by ATSC, and it will not be explained here. Typically, this is achieved well ahead of moment of ad replacement, with enough time to communicate user profile, device capabilities such as support for various video resolution, audio and video compression techniques, file formats, available memory, availability of multiple decoders, latency involved when repurposing decoders etc. Based on this information the DAI decisioning server would select appropriate replacement ads, perhaps concatenate them and deliver them to TV set, or generally to the terminal device.

What is left to do is to inform device about exact timing of the ad insertion for each replacement ad. In some scenarios, when ad insertion point is known well in advance, it could be also communicated over the broadband, and the device could be instructed to use one of many timing systems to time ad insertion precisely. It is desirable for DAI system to work also in time-shift scenarios, when the broadcast is recorded for later viewing. So, the first step is to establish the media time and then to specify the insertion moment on the media timeline. The media time can be established using either fingerprinting or watermarking, which is well known to those skilled in the art, and thus will not be described here.

Watermark Payload Considerations

In the case of live broadcast, the timing of ad insertion is known only a short time before the DAI execution, and device may not be able to get this information over the broadband quickly enough. Furthermore, having a large number of devices attempting to get timing information simultaneously would increase web congestion and increase likelihood of failing to get the information in time. One possible solution is to use video watermarks to mark default ads. In the case of multiple default ads each one should be marked differently in order to find proper replacement ads for them, e.g. to match them by duration. For example, each instance of a default ad can be assigned a different identifying number (e.g. random, sequential or otherwise determined) and this number can be included as part of the watermark payload. Those identifying numbers can be linked to replacement ads when the replacement ads are fetched to device memory. When a watermark carrying a particular identifying number is detected the replacement ad associated with this number should be inserted into the presentation.

It should be noted that video watermarks can get distorted in distribution channel or video recording devices due to transcoding, picture resolution reduction, frame rate changes, high motion and/or high entropy content, etc. In the case where video watermark is distorted the video watermark detector can choose to link the detected watermark with a particular ad even if the extracted identifying number doesn't match perfectly the identifying number received over the broadband. The detector can count the bit mismatches between the extracted identifying number and the expected identifying number, and if the count is below a threshold it could initiate the DAI. This approach is similar to adding error correction to the watermark payload. It is particularly effective—offering lower likelihood of false, erroneous and missed detections than other error correction techniques—if the identifying numbers are determined such that each instance is statistically independent and uncorrelated from others; e.g. via a random, pseudorandom, or cryptographic techniques.

For example, the embedded watermark can contain owner ID, channel ID, and/or non-random ad ID, which are encrypted and placed as portion or as entire watermark payload. If this identifier is pre-fetched over broadband or if the unencrypted data fields are delivered to the TV and encrypted using the same key used for encrypting them in the watermark payload, the detector can similarly do bit mismatch counting, and initiate DAI if the count is below a threshold. In the above scenario it is important that the watermark in the first frame of the default ad is detected. If the replace ad is not started with the first frame the default ad would bleed through creating significant artefact. The first frame watermark could be lost because of various processing in the distribution channel as discussed above.

Besides, if ATSC 3.0 video watermarks are inserted by the broadcast station they could interfere with watermarks that are inserted upstream from the station. Note that some ATSC 3.0 video watermarks have very precise timing requirement, which may make them interfere exactly with the first frame watermarks.

One way to mitigate issues listed above is to put a few black frames at the beginning of the default ad. If the first frame watermark is missed for whatever reason, this would cause black frames to bleed through, which is not going to surprise users as even now many transitions from one ad to another are including a few black frames in between. We have found also experimentally that ATSC video watermarks embedded in black frames are more robust to various distortions than those embedded in regular content, in view that black frames have a very low entropy.

The information about the count of black frames that are leading into default ad can also be pre-fetched, so that the terminal device has advanced knowledge how long is the time interval where the starting DAI is safe. In the case when DAI is started later than ideal it is important to finish inserted ad on time, and not to step on programing content. To prevent this, the default ads should carry watermarks with information when the programing content will return (network-in information). Note that if inserted ad is slightly shorter than the default ad, the terminal device should pad inserted ad with black frames to prevent bleed through of the default ad.

Another way to mitigate issues listed above is to send multiple video watermarks ahead of the splicing point, each of them carrying information about timing of the splice point, in addition to the ad ID. For example, the timing of the splicing point can be expressed as number of video frames between the marked frame and the start of the default ad. Alternatively the timing information could be expressed as a count of a predefined timing unit, say as a number of 10 ms intervals, from the watermarked frame to the insertion point. Alternately, the timing information could be expressed as a time value on a reference timeline that is known by other means, such as through other video watermark messages, audio watermark messages, audio or video fingerprinting systems, or metadata transmitted together with the programming content. Redundant watermarking reduces the risk that the mark will be missed, and allows a flexible selection of which frame needs to carry the timing information. Furthermore, the timing information can be protected using error correction codes that are well known to those skilled in the art.

One way to insert advanced information about pending default ads is to put non-replaceable ads in front of default ads, and during non-replaceable ads send the timing info and replacement ad ID for all default ads. Of course, it is possible to insert advanced information about pending default ad in the program content itself. The 4 second lead time between the decision to allow DAI and the start of the DAI slot, as specified in SCTE 35 standard, leaves plenty of room for redundant delivery of multiple replacement ad IDs and their timing information.

It should be noted that the an ad ID and timing information represent relatively small payload which could easily fit the user_private_message( ) specified by ATSC in https://www.atsc.org/wp-content/uploads/2017/03/A336-2017-Content-Recovery-in-Redistribution-Scenarios-1.pdf. For example, ad ID can be 72 bit long and timing info in the form of 10 ms counts can be 16 bit long, but protected using error correction code BCH(63,16,11) with one bit reserved. This could be placed into 136-bit payload of user_private_message( ).

As mentioned above the ATSC audio watermarks have much smaller throughput than video watermarks, and they don't have specified general-purpose payloads. Yet they can also be used as a vehicle to carry replacement ad IDs and their timing information for the advanced notification about pending default ads. A possible approach is to allow audio watermark embedder to modify scramble sequence used in standard ATSC payloads so that standard audio watermark detector would fail to extract embedded payload. Modified scramble sequence should be delivered over the broadband together with other DAI related information according to standard web protocols. Once this modified scramble sequence is received the audio watermark detector should attempt decoding subsequent payloads with both standard and modified sequence for a predefined period of time, or until detection of watermark segment end. When a payload is detected with the modified scramble sequence, the detector will understand that it contains replacement ad ID and time to default ad start. For example, the replacement ad ID can be 34-bit ad ID and time to default ad start can be 16-bit counter of 10 ms intervals.

Having in mind relative strengths and weaknesses of audio and video watermarking technologies it is possible to combine them so that audio watermarks are used to identify the broadcast channel and address of the server associated with broadcast channel which is designated to support DAI, while video watermarks are used to carry replacement ad ID and timing information.

Security Considerations

The main security objective is to prevent a foreign ad replacement application to read embedded watermarks and discover start time and duration of replaceable ads. In order to achieve this, it is desirable that DAI client in the terminal device and DAI decisioning servers should perform mutual authentication based on Transport Layer Security (TLS) protocol. The DAI clients should receive DAI instructions only from authenticated DAI decisioning servers, and DAI decisioning servers should provide DAI instructions only to authenticated DAI clients. Compromised certificates could be revoked using Online Certificate Status Protocol (OCSP)

Clearly if only default ads are marked with video watermarks it would be easy to identify marked frames and replace them. Similarly, if default ads are marked with video watermarks with distinct properties, such as distinct frame structure, it would be unsecure. Therefore, it is desirable to embed watermarks in advance of default ads, as proposed above.

It is important that the proposed 16-bit timer is not easy to extract and use to identify the start time of the default ad. For example, in the case of video watermarks based on the user_private_message( ) specified by ATSC described above, this timer is protected by BCH(63,16,11) with one bit reserved. After that it can be scrambled with one-time scrambling pattern 64-bit long, that is securely delivered to an authenticated DAI app during delivery of other DAI related information over the broadband. Since this is one-time pattern associated with a particular replacement ad, reverse engineering of (e.g. by measuring actual time between the watermark and the replacement start) it is not going to help with other DAI instances. Similarly, the audio watermarks are scrambled with 127-bit long modified scramble sequence that is unique for a particular default ad.

The insertion end point, or default ad duration, could be specified with respect to the default ad start and pre-fetched over the broadband. Presumably the inventory decisioning logic will select replacement ads that closely fit the duration of the default ads. Alternatively, the end of the default ad could be specified using a timer embedded during the default ad in a manner similar to that described for the timer used to specify the start of the default ad as descried above.

In order to further frustrate a determined attacker, it is possible to introduce a decoy watermark messages that would use ad IDs and time stamps that are actually not associated with any replacement ads, and approved DAI app will simply discard those because the ad ID will not match any of the replacement ads that are pre-fetched.

Upstream User Action Detection

One of the issues listed above is to detect user action on a device upstream from TV set, such as STB or DVR and act accordingly. One of the objectives could be that DAI application matches the user selection, such as pause, speed change, skip, or volume change. Another option is to abandon DAI whenever upstream user action is detected, and to return to default ad. Presumably the default ad will exhibit results of the user action too. The third option is to make user aware that the current presentation is coming from DAI app, and if user want to execute action on an upstream device it is necessary to first exit the current presentation. Any of these options would prevent user to suspect a malfunctioning of the upstream device.

Detection of many common changes to the presentation of the default ad by the upstream device can be determined using "loss of continued watermark detection" as an indicator. For this reason, it is beneficial that the default ad contains watermarks throughout their duration and that the TV use their continued detection (or lack thereof) as an indicator of continued receipt. For this reason, continued application of the watermark transmission and detection techniques described above for the duration of the default ad presentation is beneficial.

Our research shows that ATSC video watermarks can reliably detect upstream pause, speed change, or skip and could approximately determine speed change or skip size as long as the default ads are embedded with a string of video watermarks with a payload that includes timing information, say time from the beginning of the default ad. Therefore, the ATSC video watermarks can be used to adjust the timing of the DAI presentation in correspondence to timing changes in the upstream content. If the adjustments of DAI presentation are made it would be desirable to inform user of the adjustment made using a partial overlay message. For example, if fast-forward is detected at 2× rate the replacement ad should be fast forwarded at 2× and an overlay should inform user that 2× playback is executed.

Our research also shows that certain upstream user actions, such as channel changes, pause, speed change and skip can be identified by a brief digital silence interval. Note that audio watermarks can cover digital silence intervals preexisting in native audio as disclosed in U.S. Pat. No. 9,805,434. Therefore, digital silence gaps can be used to trigger the end of DAI and return to default ad or whatever new channel user is selecting.

Our research further shows that volume change request sent to STB or DVR is most of time not actually executed on upstream device, but rather it is communicated to the actual audio rendering device such as TV set. In this case the TV set will get audio volume information and could pass it to DAI ap. However, it is also possible to do a real time audio loudness measurement and adjust DAI loudness accordingly.

Some user actions may cause partial screen overlay that could be masked in the case of DAI. For example, the user may expect volume control overlay when trying to adjust volume. Similarly, menu selection on upstream device may trigger picture-in-picture with menu options. Even external event such as a phone call may create an overlay with the caller ID, which could be masked in the case of DAI. One of the solutions for those cases is, of course, to have user be aware that they are watching web-based content, and that it needs to exit it in order to return to desired screen. Examples of such solutions include display of a graphic icon or informative text superimposed on the inserted advertisement by the TV or illumination of an indicator on another visible location (e.g. TV frame or remote control).

Yet another solution is to have a screen state detection logic that would detect such overlays and terminate DAI automatically. Our research shows that every device, such as STB or DVR, has a limited set of display overlay options, and that they can be identified in advance and that their templates can be stored on the web servers. Any device could download those templates and try to detect them on the screen by correlating specific portions of the screen with the templates. If the correlation is above a threshold, the overlay detection is declared and DAI can be modified (e.g. by conforming, skipping, or terminating the presentation).

Yet another solution is to compare video fingerprints which are extracted upstream of the STB to video fingerprints extracted in the TV. Differences between the two fingerprints can be attributed to video modification by the STB and overlay detection is declared and the DAI can be modified (e.g. by conforming, skipping, or terminating the presentation).

The above proposed solutions can be combined in various ways. For example, if audio gap is detected, the device may delay taking down the replacement ad while video watermark detector tries to interpret user action and adjust DAI accordingly. But if those attempts fail within a predefined time interval, the replacement ad should be taken down.

Similarly, the user should be informed that the current presentation is coming from a DAI app in parallel with attempts to detect screen overlays and automatic DAI termination, so that if screen overlay detection fails the user has the option of manually exiting the replacement ad.

Watermarking Approach

The watermarking approach disclosed herein emphasizes three capabilities: 1) ATSC Interoperability; 2) reliability; and 3) security. Interoperability means that there is interoperability with other uses of the ATSC A/335 and A/336 specifications, including the use of A/336 framing including message header and CRC. This approach also permits multiplexing of Project OAR (OAR) (https://projectoar.org/) and ATSC messages. Thus, ATSC and OAR watermark message protocols will be non-interfering and broadcasters will be able to send watermark messages to both OAR and ATSC clients at the same time. Likewise, OAR TVs and ATSC TVs will both be able to receive the broadcast and operate correctly. This approach enables the option of cleartext transmission of timestamps in OAR payloads.

In more detail, OAR messages use the extensibility method defined in A/336 for introducing new watermark message formats. OAR defines a message format using the A/336 extensibility approach and requests that ATSC add it to their registry. This allows any TV to distinguish OAR and ATSC messages.

It is also desirable for OAR to: (a) permit safe launch frames to be announced/identified so that launch success is not dependent on a single frame (also providing a reliability benefit); (b) allow multiplexing OAR with other messages during default ads; and (c) enable joint ATSC/OAR usage of timestamps.

Regarding reliability, it is noted that a weak error correction/detection scheme will cause watermark failures. Low-bitrate coding and high motion video will cause intermittent watermark loss and high motion video can cause continuous watermark degradation (not just sporadic). This will cause insertion opportunities to be missed, failed timeline tracking, or erroneous DAI termination. To address these issues, the present disclosure enables matched filtering of payloads with advanced error correction and supports marked pre-roll. The present disclosure recognizes that matched filtering is far superior to Single Error Correction Double Error Detection (SECDED). Matched filtering is a provably optimal method for detecting a known signal and is guaranteed to outperform error correction/detection schemes like SECDED/BCH/Reed-Solomon, while also being much simpler. These other techniques are only needed when the reader doesn't know the message being transmitted Also, matched filtering is easily introduced into the OAR architecture via decision server response. It is sufficient to include the watermark message in the decision server response (or enough info for client to synthesize it). Separation of static (avail description) and dynamic (timecode) data may be beneficial. Note that most "watermark fields" don't have to be in the watermark; avail ID and timecode are the only essential ones.

To illustrate how payload architecture impacts reliability, FIG. 1 shows comparative testing of different approaches. During these tests, performance of a sample implementation was measured across a variety of payload encoding methods. Scene Change frames are typically encoded as I-frames and enable more reliable watermark recovery. Reliable recovery of all frames is necessary for low-latency trick-play tracking.

Regarding security, it is desirable that security is preserved by ensuring that a watermark cannot be interpreted without decision response and decryption keys. Since key management is complex and costly, the present disclosure uses mutual authentication as an alternative to KMS. In more detail, TVs are provisioned by OAR operator with a unique client certificate tied into OAR PKI. Decisioning servers provide decisioning responses only to authenticated TVs. Decision responses contain all watermark fields; watermarks carry very limited information. Compromised certificates can be revoked using Online Certificate Status Protocol (OCSP). This eliminates the need for symmetric key distribution (requires certificate distribution only). It is noted that mutual authentication protocol impacts decisioning server operation and that certificate management and device provisioning are still required. Process development and effort is required to detect, revoke compromised certificates.

In accordance with one embodiment of the present disclosure, an important feature is to swap the publisher data paths. See FIG. 2. This involves swapping the publisher outputs, so the encrypted message is in the Decision Response and the payload is in the watermark message. The encrypted message is sent in the Decision Response. Payload in encrypted message has increased size and can be a list (wildcard support not recommended), and run-in and timestamp are not carried in the encrypted message. The watermark carries only: A/336 run_in and header; payload (with increased size); timestamp (encryption optional) with BCH error correction. This yields 400% bit error tolerance vs. SECDED. To enable ATSC compatibility, two watermark payloads should be defined; one with an encrypted timestamp and one cleartext.

Decision Response

"Watermark payload to match to (may include wildcards)" is replaced by: 1) Header (unencrypted): watermark_version; consortium_key_id; and random_number; 2) Consortium encrypted block: validation; publisher_id; publisher_key_id; and random_number; 3) Publisher encrypted block: validation; ad_duration; and one or more payloads to match to.

Figure 3:
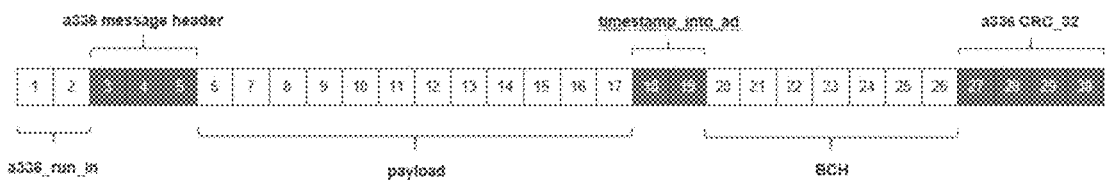
FIG. 3 illustrates the watermark payload in accordance with an embodiment of the invention.

The watermark payload is described in FIG. 3.

OAR participant features relate to both publishers and the TV. For publishers, the payload must be selected randomly to ensure low probability of collisions. Also, decisions applicable to multiple avails must be specified via payload list rather than wildcard. Timestamp encryption is optional. For the TV, decryption is applied to the encrypted message in the decision response instead of an encrypted watermark payload. Also, matched filtering is used for watermark payload detection. BCH error correction is used for timestamp payload detection.

Figure 4:
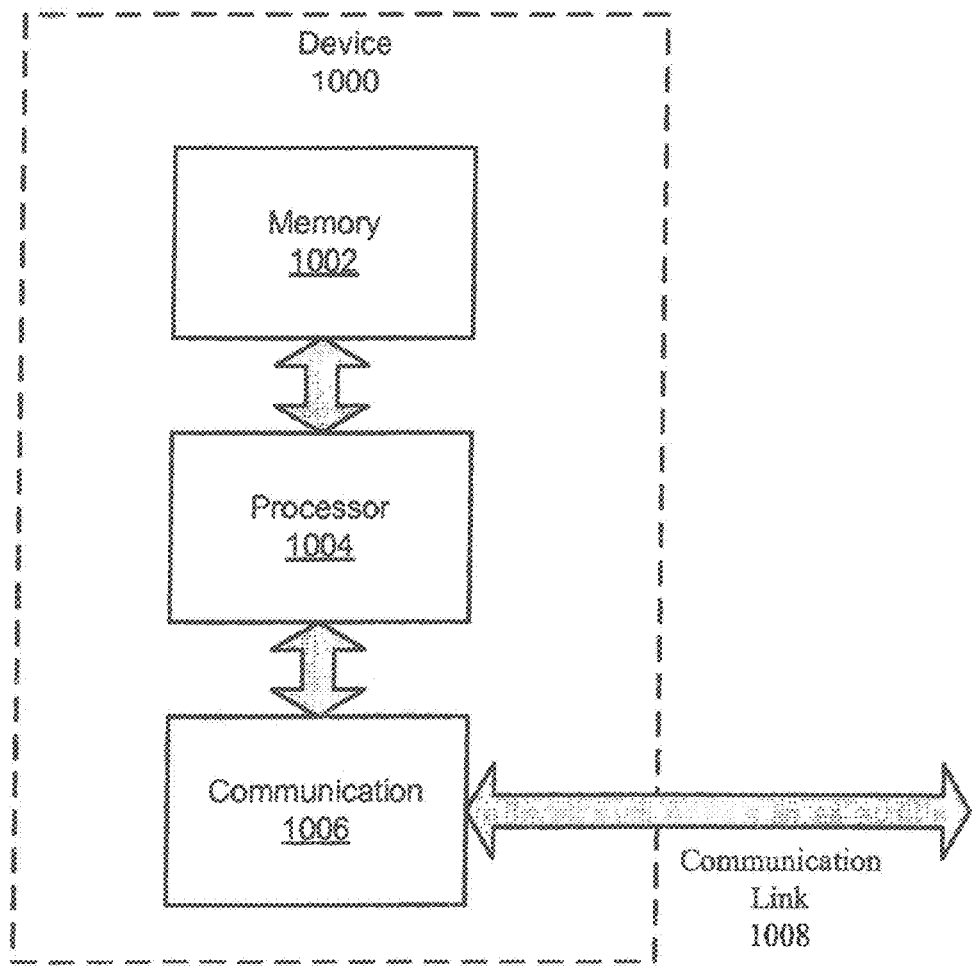
FIG. 4 illustrates a block diagram of a device that can be used for implementing various disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 4 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 4 the device 1000 and the like may be implemented in software, hardware, firmware, or combinations thereof. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of facilitating dynamic content replacement in content comprising:
   identifying an input video stream at a receiver, the input video stream including nonreplaceable and replaceable content;
   contacting an ad decisioning server associated with the input video stream
   the ad decisioning server identifying a replaceable content identifying number contained in a watermark payload in the replaceable content, wherein the replaceable content identifying number is linked to a replacement content;
   the ad decisioning server selecting one or more replacement contents based on the identified replaceable content identifying number;
   the ad decisioning server transmitting the one or more identified replaceable content identifying numbers to the receiver;
   receiving the one or more replacement contents linked to the identified replaceable content identifying number at the receiver;
   analyzing the input video stream at the receiver to detect the presence of a watermark payload containing a replacement content identifying number embedded in the replaceable content; and
   when a watermark payload embedded in particular replaceable content in the input video stream contains a particular replaceable content identifying number, replacing the particular replaceable content in the input video stream with the replacement content linked to the particular replaceable content identifying number.

2. The method of claim 1 wherein the step of identifying the input video stream further comprises retrieving metadata using ATSC 3.0 watermarks in the input video stream to identify a broadcast channel.

3. The method of claim 1 wherein the step of contacting an ad decisioning server comprises using a watermark to identify an address of the ad decisioning server.

4. The method of claim 1 wherein the ad decisioning server is identified using metadata retrieved using an ATSC watermark.

5. The method of claim 1 wherein the replacement content ad is identified by an ad ID carried by the watermark payload.

6. The method of claim 1 wherein the ad decisioning server performs mutual authentication with a device and delivers an ad decision only if the device is authenticated.

7. The method of claim 1 wherein the step of analyzing comprises using matched filtering/prediction.

8. The method of claim 1 wherein the replacement content is synchronized to a replaceable ad using timecodes carried in the watermark payload.

9. The method of claim 1 further comprising the steps of:
   detecting when a watermark payload in the input video stream contains a particular replaceable content identifying number and timing information about the particular replaceable content; and
   replacing the particular replaceable content in the input video stream with replacement content linked to that identifying number; and
   adjusting a timing of the replacement content that replaced the particular replaceable content in correspondence to the timing information about the replaceable content.

10. The method of claim 9 further comprising:
    using the adjusted timing information of the replacement content that replaced the particular replaceable content to detect upstream operations performed on the particular replaceable content including at least one of: pause, speed change, or skip operations.

11. The method of claim 9 further comprising the step of:
    displaying to a user information related to the adjustment of the timing of the replacement content by means of a partial overlay message.

12. The method of claim 1 further comprising;
    when the analyzing detects a replaceable content identifying number that does not match a particular identified replaceable content identifying number, counting the number of mismatches between the detected replaceable content identifying number and the particular identified an expected replaceable content identifying number; and
    if the number of mismatches is below a threshold, replacing the particular replaceable content with a replacement ad linked to the particular identified replacement content identifying number.

13. The method of claim 12 wherein the ad decisioning server provides an encrypted replaceable content identifying number to the receiver and the receiver performs decryption on the encrypted replaceable content identifying number to obtain a replaceable content identifying number that is carried in the watermark payload.

14. The method of claim 1 wherein the watermark is a video watermark.

15. A device comprising:
    a processor; and
    a memory including processor executable code, the processor executable code, when executed by the processor, causes the device to;
    identify an input video stream at a receiver, the input video stream including nonreplaceable and replaceable content;
    contact an ad decisioning server associated with the input video stream, the ad decisioning server identifying a replaceable content identifying number contained in a watermark payload in the replaceable content, wherein the replaceable content identifying number is linked to a replacement content;

the ad decisioning server selecting one or more replacement contents based on the identified replaceable content identifying number;

the ad decisioning server transmitting the one or more identified replaceable content identifying numbers to the receiver;

receive the one or more replacement contents linked to the identified replaceable content identifying number at the receiver;

analyze the input video stream at the receiver to detect the presence of a watermark payload containing a replacement content identifying number embedded in the replaceable content; and when a watermark payload embedded in particular replaceable content in the input video stream contains a particular replaceable content identifying number, replacing the particular replaceable content in the input video stream with the replacement content linked to the particular replaceable content identifying number.

16. A computer program product, embodied on a non-transitory computer readable medium for facilitating dynamic content replacement in content, comprising:

program code for identifying an input video stream at a receiver, the input video stream including nonreplaceable and replaceable content;

contacting an ad decisioning server associated with the input video stream, the ad decisioning server identifying a replaceable content identifying number contained in a watermark payload in the replaceable content, wherein the replaceable content identifying number is linked to a replacement content;

the ad decisioning server selecting one or more replacement contents based on the identified replaceable content identifying number;

the ad decisioning server transmitting the one or more identified replaceable content identifying numbers to the receiver;

receiving the one or more replacement contents linked to the identified replaceable content identifying number at the receiver;

analyzing the input video stream at the receiver to detect the presence of a watermark payload containing a replacement content identifying number embedded in the replaceable content; and when a watermark payload embedded in particular replaceable content in the input video stream contains a particular replaceable content identifying number, replacing the particular replaceable content in the input video stream with the replacement content linked to the particular replaceable content identifying number.

* * * * *